United States Patent [19]

Feldman et al.

[11] 4,413,906
[45] Nov. 8, 1983

[54] PASSIVE OPTICAL RANGEFINDER/SEXTANT HAVING SEARCH CAPABILITY

[75] Inventors: Sidney Feldman, Silver Spring, Md.; George G. Barton, Jr., Harker's Island, N.C.

[73] Assignee: The United States of America as represented by the Secretary of the Navy, Washington, D.C.

[21] Appl. No.: 277,376

[22] Filed: Jun. 25, 1981

[51] Int. Cl.³ .................... G01B 11/26; G01C 1/00
[52] U.S. Cl. .................................... 356/141; 356/4; 356/140; 356/144; 356/145; 356/146; 356/147
[58] Field of Search ............... 356/141, 152, 140, 144, 356/145, 146, 147, 4

[56] References Cited

U.S. PATENT DOCUMENTS

| | | |
|---|---|---|
| 3,204,102 | 8/1965 | Hand, Jr. .......................... 356/141 |
| 3,889,052 | 6/1975 | Back ................................. 358/108 |
| 3,985,446 | 10/1976 | Feldman et al. .................. 356/144 |
| 4,009,960 | 3/1977 | Feldman et al. .................. 356/1 |
| 4,162,124 | 7/1979 | Feldman et al. .................. 356/4 |

Primary Examiner—S. C. Buczinski
Attorney, Agent, or Firm—R. S. Sciascia; A. L. Branning; J. G. Wynn

[57] ABSTRACT

Uniquely integrating a search mirror and a deflection mirror with a passive optical rangefinder and a remote sextant, enhances the operation of both devices. The improved rangefinder/sextant provides day/night 360° azimuthal and at least −5° to about 60° elevational search capability with the additional capability of pointing the search mirror at a navigational star in a direction different from that of an imaging camera. Thus, the imaging camera, can be pointed at the sea horizon that is least obscured by haze and/or sea clutter, thereby allowing altitude readings under adverse conditions.

4 Claims, 4 Drawing Figures

PASSIVE OPTICAL RANGEFINDER/SEXTANT HAVING SEARCH CAPABILITY

BACKGROUND OF THE INVENTION

1. Field of the Invention

The present invention relates generally to navigational apparatus, but more particularly to rangefinder/sextant apparatus having a combined search capability.

2. Description of the Prior Art

Radar is the standard and dominant method of determining range, azimuthal and elevational data. The data is used for search, navigational and weapons fire control purposes. However, radar has poor resolution. Objects appear as blips on its CRT face, and these blip presentations are subject to error from sea clutter making interpretation of information therefrom difficult. In addition, when radio silence is mandatory to prevent Fleet location, radar has to be shut down, and passive optical systems are required to substitute for radar for navigational and weapons fire control purposes. Optical imaging for some applications is superior to radar imaging. There are optical radar systems which provide simultaneous optical images and range information. But these active systems can be detected by infrared receivers. There is optical 360° search systems in the prior art but they do not have a passive rangefinding capability or a sextant function capability.

As further background material, and incorporated herein by reference, U.S. Pat. No. 4,162,124, to Feldman et al., entitled, "Passive Optical Rangefinder - Sextant", and assigned to the same assignee as the present application, discloses a remotely controllable optical navigational instrument using rotatable index and stationary horizon mirrors in pairs asymmetrically disposed about a vertical plane bisecting the longitudinal axis of a stabilized horizontal imaging camera. The axes of rotation of the index mirrors are mutually normal and perpendicular to the longitudinal axis. When fixed at infinity, the index mirrors convey a double image of distant objects, via their respective horizon mirrors, to a spherical reflector and onto the imaging camera. Cooperating electronic circuitry selectively filters and scans the double image to determine the range of the object. Independently, the index mirror, rotatable about the horizontal axis, serves to measure altitude. The index mirror rotatable about the vertical axis serves to measure horizontal angles.

The present invention adds 360 degrees azimuthal and at least −5° to about 60° elevational search capabilities to the above mentioned apparatus of Feldman et al. In addition, the apparatus, according to the present invention, enhances the operational aspects of the remote sextant portion of the Feldman et al apparatus by allowing pointing of a search mirror at a navigational star in a direction which differs from that of an imaging camera which can be independently pointed at the sea horizon that is the least obscured by haze and/or sea clutter, thereby allowing altitude readings under adverse conditions.

The prior art, as indicated hereinabove, include advances in passive optical rangefinder/sextant apparatus, including remotely controllable index mirrors; however, in so far as can be determined, no prior art device incorporates all of the features and advantages of the present invention.

OBJECTS OF THE INVENTION

Accordingly, a principal object of the present invention is to incorporate using a single imaging camera 360° azimuthal and at least −5° to about 60° elevational search capabilities to an optical rangefinder/sextant in an improved manner.

A further object of the present invention is to enhance the operation of the sextant portion of the improved rangefinder/sextant to use a search mirror element thereof to point at a navigational star in a direction which differs from that of an imaging camera element thereof, which can be pointed independently at the sea horizon that is the least obscured by haze and/or sea clutter, thereby obtaining altitude readings under severe conditions.

SUMMARY OF THE INVENTION

In accordance with the above stated objects, other objects, features and advantages, the present invention has as a primary purpose to add an improved search capability to a rangefinder/sextant similar to that disclosed in U.S. Pat. No. 4,162,124 to Feldman et al (hereinafter, the Feldman et al Patent), and by addition of a search mirror to use the improved rangefinder/sextant to enhance the operation of the apparatus as a sextant.

The essence of the present invention is in the use of the search mirror in a dual function role as a scan mirror in both elevation and azimuth, and as a portion of a sextant such that the search mirror element of the present invention can be pointed at a navigational star in a direction which differs from that of an imaging camera element which can be pointed independently at the sea horizon that is the least obscured by haze and/or sea clutter, thereby obtaining altitude readings under severe conditions.

The purpose of the invention is carried out by configuring a search mirror in combination with a fixed deflection mirror and adding the combination to a modified version of the rangefinder/sextant of the Feldman et al Patent. Elements are included not only for rotating the search mirror elevationally but also azimuthally. The inherent features of the Feldman et al Patent are kept intact by the modification.

BRIEF DESCRIPTION OF THE DRAWINGS

The previously stated objects, other objects, features and advantages of the present invention will be apparent from the following more particular description of the preferred embodiment as illustrated in the accompanying drawings, in which.

DESCRIPTION OF THE PREFERRED EMBODIMENT

Figure 1:
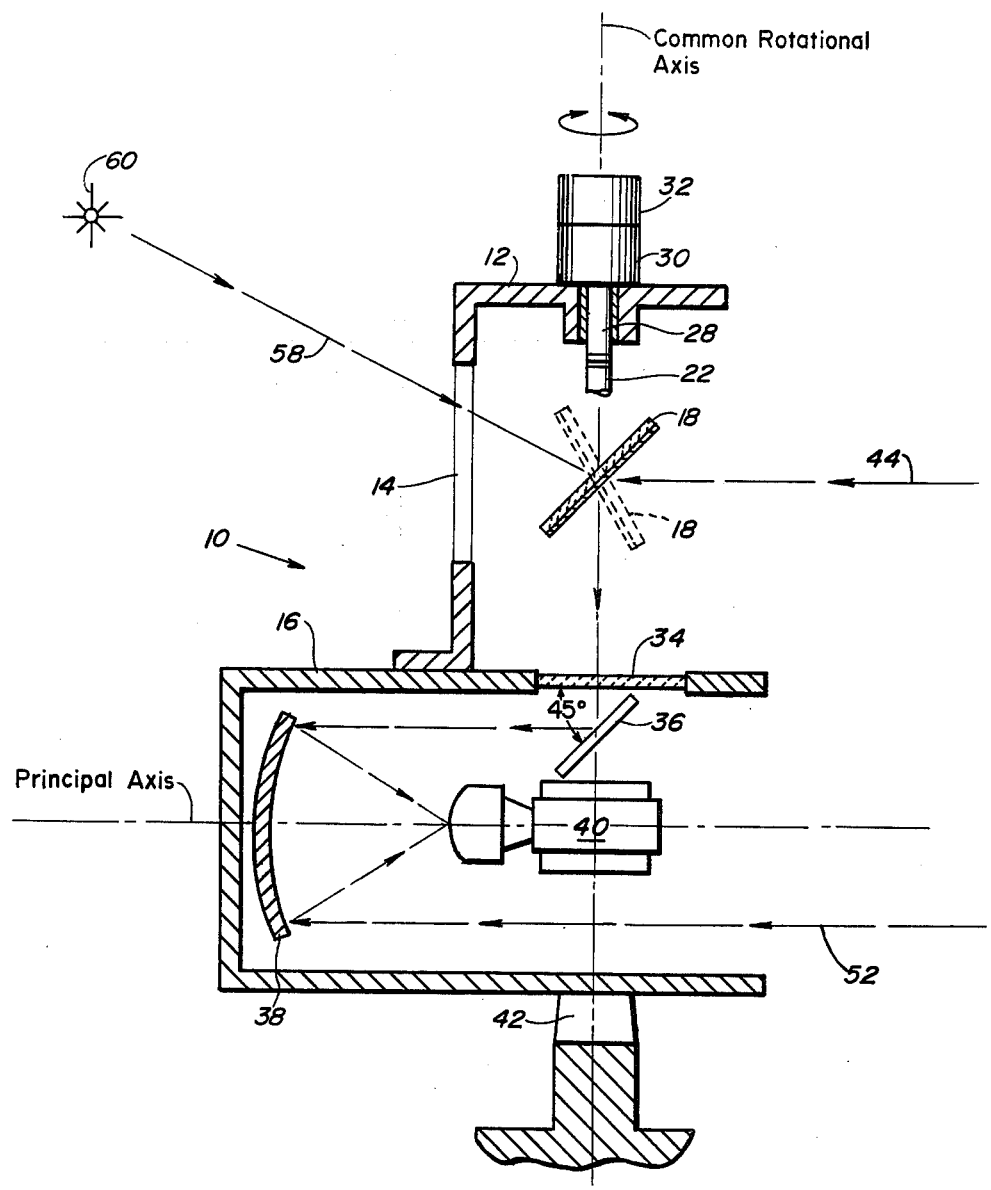
FIG. 1 is partial sectional and elevational view of the improved rangefinder/sextant, according to the present invention, depicting, inter alia, a search mirror and a search mirror support.

FIG. 1 shows an embodiment of an apparatus in which the present invention is employed. The apparatus, a search rangefinder/sextant 10 comprises a search mirror support 12 having a search mirror aperture 14. Search mirror support 12 is affixed to the top of an optical housing 16 such that search mirror aperture 14 will allow sufficient light to impinge on a search mirror 18 when it is rotated into the position shown in phantom outline.

Figure 2:
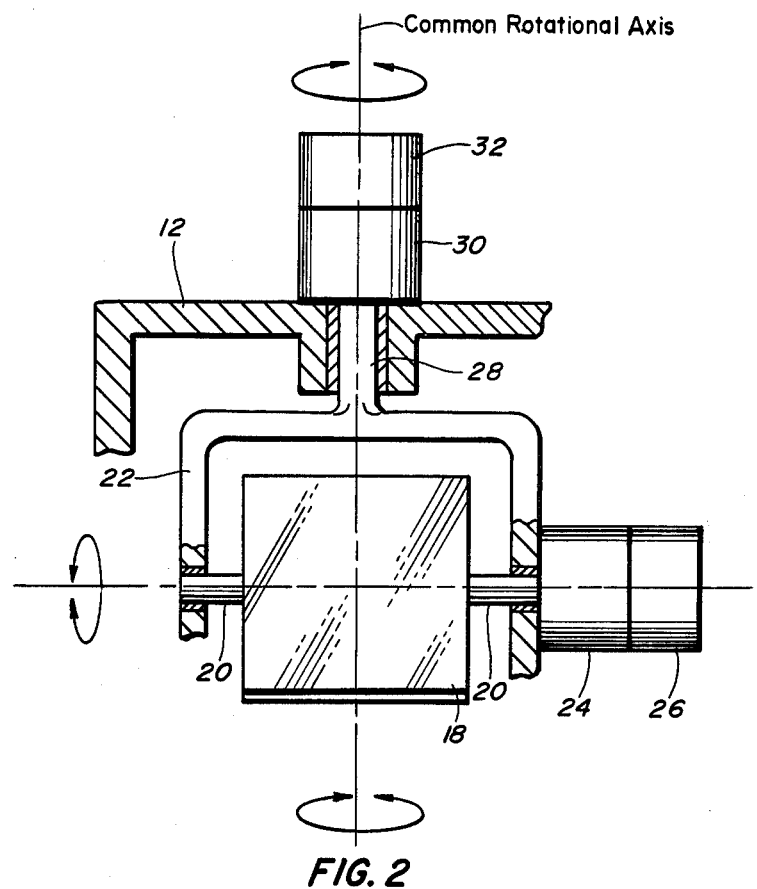
FIG. 2 is a pictorial view, showing how the search mirror is mounted for azimuthal and elevational rotation in relationship to a search mirror support and other elements of FIG. 1.

Referring then to FIGS. 1 and 2 as viewed concurrently, search mirror 18 is operatively affixed for elevational rotation by a mirror shaft 20 being affixed thereto and being journaled into mirror yoke 22. Mirror shaft 20 is operatively attached to an elevational drive motor 24 which is reversible and has variable speed operation to rotate search mirror 18 elevationally. Also operatively attached to mirror shaft 20 is an elevational shaft encoder 26 for determining the elevational incremental position of search mirror 18. For purposes of the present invention, the motor, encoder and associated electronics of the Feldman et al Patent or similar devices can be used with the present invention.

Still referring to FIGS. 1 and 2 as viewed concurrently, a mirror yoke shaft 28, integral to mirror yoke 22, is journaled into mirror support 12 thereby affixing search mirror 18 for azimuthal rotation about mirror yoke shaft 28. Mirror yoke shaft 28 is operatively attached to an azimuthal drive motor 30 which is reversible and has variable speed operation for causing search mirror 18 to be rotated azimuthally. Also operatively attached to mirror yoke shaft 28 is an azimuthal shaft encoder 32 for determining the azimuthal incremental position of search mirror 18. Likewise, the devices and electronics used in the Feldman et al Patent or similar devices can be used with the present invention.

Referring again to FIG. 1 alone, optics housing 16 further includes a transparent cover/aperture 34 in the top portion thereof for allowing sufficient light to impinge onto a fixed deflection mirror 36 which is suitably affixed at 45° to the top of optics housing 16. Included in optics housing 16 is a spherical mirror 38 mounted towards the rear thereof and an imaging camera 40 disposed towards the front thereof on the principal optical axis of spherical mirror 38. An optics housing yoke 42 is mounted to the bottom of optics housing 16 such that the weight of optics housing 16 and the elements therein are balanced for azimuthal and/or elevational movement. In addition, there is a common axis, as shown, for search mirror 18, fixed deflection mirror 36 and optics housing yoke 42. For purposes of the present invention, the spherical reflector (mirror), imaging camera and electronics of the Feldman et al Patent are well suited for use with the present invention.

It should be noted that the rangefinder and sextant operations, as disclosed in the Feldman et al Patent, are incorporated herein, and accordingly, will not be discussed further. The search operation and the additional use of the added search mirror to enhance the sextant operation are the key contributions of the present invention, and will be discussed hereinafter in the section entitled, "Statement of the Operation".

STATEMENT OF THE OPERATION

Details of the operation, according to the present invention, are explained in conjunction with FIGS. 1, 2, 3a and 3b as viewed concurrently.

As previously stated, the present invention adds 360° of azimuthal and at least −5° to about 60° of elevational scan and/or search capability to the remote sextant capability and the passive optical rangefinder capability of the devices disclosed in the Feldman et al Patent. For purposes of the present invention, the embodiment best suited for use with the present invention is the alternate embodiment depicted in FIG. 10 of the aforementioned Patent. It should be noted that the search and other capabilities are added without upsetting the operation of the apparatus as a sextant or rangefinder.

Figures 3A, 3B:
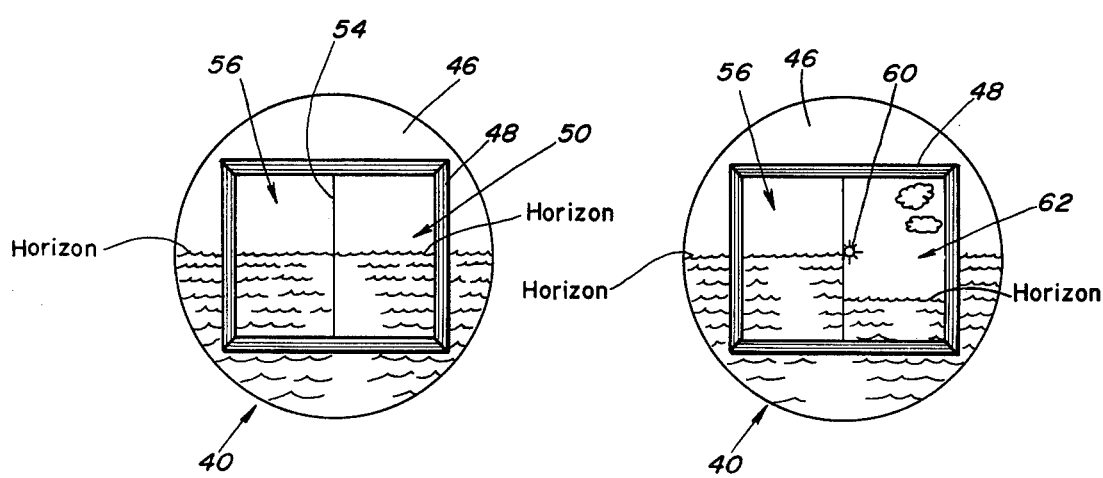
FIGS. 3a and 3b are depictions of the views seen by the imaging camera in the enhanced sextant operational mode, according to the present invention.

With the above mentioned points in mind, when search mirror 18 of search rangefinder/sextant 10 is positioned at 45°, as shown, search mirror horizon light rays 44 impinge on search mirror 18 and are deflected 90° onto fixed deflection mirror 36 via transparent cover/aperture 34. Fixed deflection mirror 36 is disposed at 45° and parallel (in this case) to search mirror 18 and in front of imaging camera 40 such that search mirror horizon light rays 44 impinge, via spherical mirror 38, onto a screen 46 of imaging camera 40, as illustrated in FIG. 3a. A. Thus, within a screen frame 48, the image formed by search mirror horizon light rays 44 is indicated by the numeral 50.

Likewise, spherical mirror horizon light rays 52, via an opened shutter, (not shown, but see the Feldman et al Patent), impinge, via spherical mirror 38, onto screen 46 of imaging camera 40 such that within screen frame 48 to the left of a screen frame centerline 54, the image formed by spherical mirror horizon light rays 52 is indicated by the numeral 56. Thus, the images of the horizon are brought in to coincidence as shown in FIG. 3a.

When the apparatus, according to the present invention, is used as an enhanced sextant for measuring altitude, the opened end of optics housing 16 of search rangefinder/sextant 10, as shown in FIG. 1, is pointed at a clear horizon, i.e., no sea clutter or haze. And in a direction, for example, 180° away, search mirror 18 is pointed by rotating it azimuthally and elevationally, as depicted in phantom outline. Search mirror 18 is positioned to deflect navigational star light rays 58 from a navigational star 60 onto screen 46 of imaging camera 40, as shown in FIG. 3b. The image formed is indicated by numeral 62. The image formed shows the instance of tangency of navigational star 60 with the uncluttered horizon shown in the image indicated by the numeral 56, aforementioned. Hence, the altitude and azimuth of the navigational star 60 can be determined by the method outlined with the navigational star 60 being in the opposite direction from the horizon used as a standard of measurement.

As indicated in FIGS. 3a and 3b, a single imaging camera 40 is used to generate the search and/or scan images and data, the enhanced sextant images and data, the sextant images and data and the rangefinder images and data (see the Feldman et al Patent, previously cited and incorporated herein by reference). However, separate imaging cameras or monitors can be used for the various functions.

To those skilled in the art, many modifications and variations of the present invention are possible in light of the above teachings. It is therefore to be understood that the present invention can be practiced otherwise than as specifically described herein and still be within the spirit and scope of the appended claims.

What is claimed is:

1. An improved rangefinder/sextant having a search capability and of the type having an optics housing including an optics housing yoke operatively attached to the bottom of said optics housing for moving thereof azimuthally and elevationally, a spherical mirror mounted towards the rear of said optics housing, an imaging camera disposed in said optics housing towards the front thereof on the principal optical axis of said spherical mirror, index mirrors and horizon mirrors symmetrically arranged in pairs on opposite sides of said optics housing and on opposite sides of the principal axis of said spherical mirror, and control means arranged such that rangefinder and sextant measurements can be made, wherein the improvement comprises:

- a search mirror device operatively attached to the top of said optics housing and configured for continuous azimuthal and elevational motion independent of the aximuthal and elevational motion of said optics housing yoke to provide the search capability; and
- a deflection mirror fixedly connected to said optics housing at an angle of 45 degrees as referred to the principal axis of said spherical mirror and mounted above said imaging camera on a rotational axis common to said search mirror device, said deflection mirror and said optics housing yoke such that light rays deflected from said search mirror device are directed via said spherical mirror to said imaging camera.

2. The improved rangefinder/sextant of claim 1 wherein said search mirror device comprises:
- a mirror support having an aperture therein, said mirror support being affixed to the top of said optics housing;
- a mirror yoke having a mirror yoke shaft integral thereto and being journaled into said mirror support for azimuthal rotation thereof; and
- a search mirror having a mirror shaft affixed thereto and journaled into said mirror yoke for azimuthal rotation about said mirror yoke shaft, and for elevational rotation about said mirror shaft, and said mirror support being affixed to the top of said optics housing such that the aperture allows sufficient light to impinge on said search mirror when said search mirror is azimuthally rotated and facing in the direction of the aperture.

3. The improved rangefinder/sextant of claim 2 wherein said search mirror device further comprises:
- an elevational drive motor operatively attached to said mirror shaft for rotating said search mirror elevationally;
- an elevational shaft encoder operatively attached to said mirror shaft for determining the elevational incremental position of said search mirror;
- an azimuthal drive motor operatively attached to said mirror yoke shaft for causing said search mirror to be rotated azimuthally; and
- an azimuthal shaft encoder operatively attached to said mirror yoke shaft for determining the azimuthal incremental position of said search mirror.

4. A method of measuring the altitude and azimuth of a navigational star using an enhanced sextant comprising the steps of:
- pointing a first optics at an uncluttered horizon thereby forming a first image thereof;
- pointing a second optics at the navigational star in an altitudinal and an azimuthal direction substantially different from the direction of the uncluttered horizon thereby forming a second image coincident in sextant fashion with the first image of the uncluttered horizon;
- rotating the second optics to bring the navigational star into tangency with the uncluttered horizon of the first image; and
- measuring the elevational and azimuthal motion of the second optics necessary to bring the navigational star into tangency with the uncluttered horizon of the first image thereby measuring the altitude and azimuth thereof.

* * * * *